Sept. 2, 1969     M. B. BLACK III     3,464,964
COAGULATION OF POLYTETRAFLUOROETHYLENE LATEX
Filed June 13, 1966
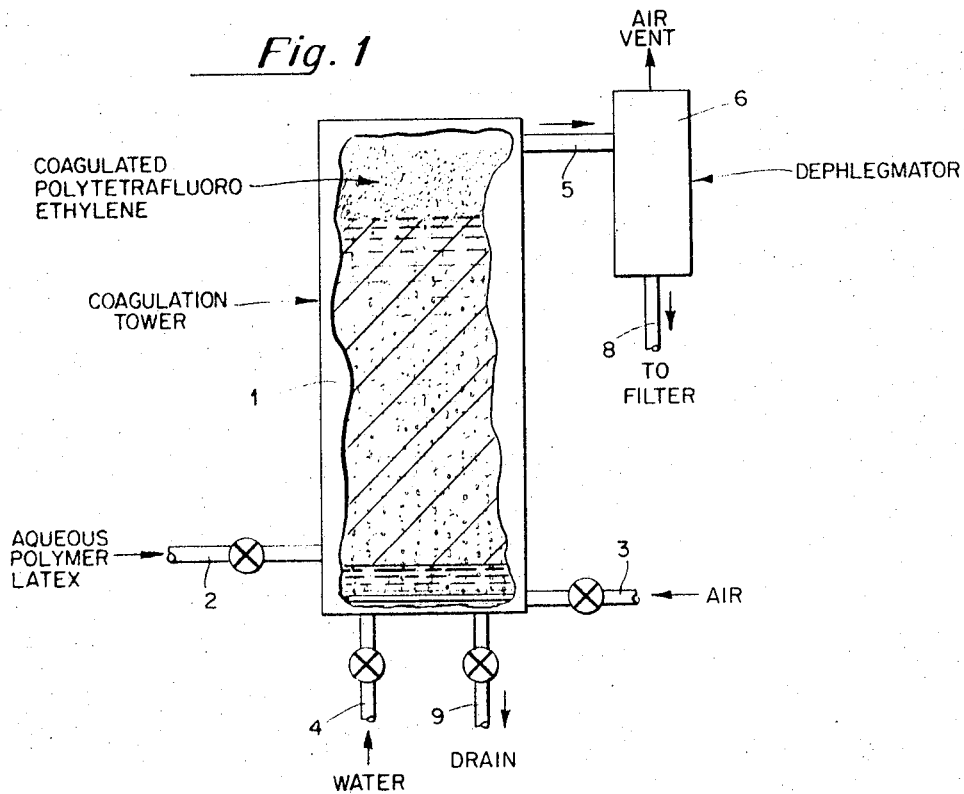
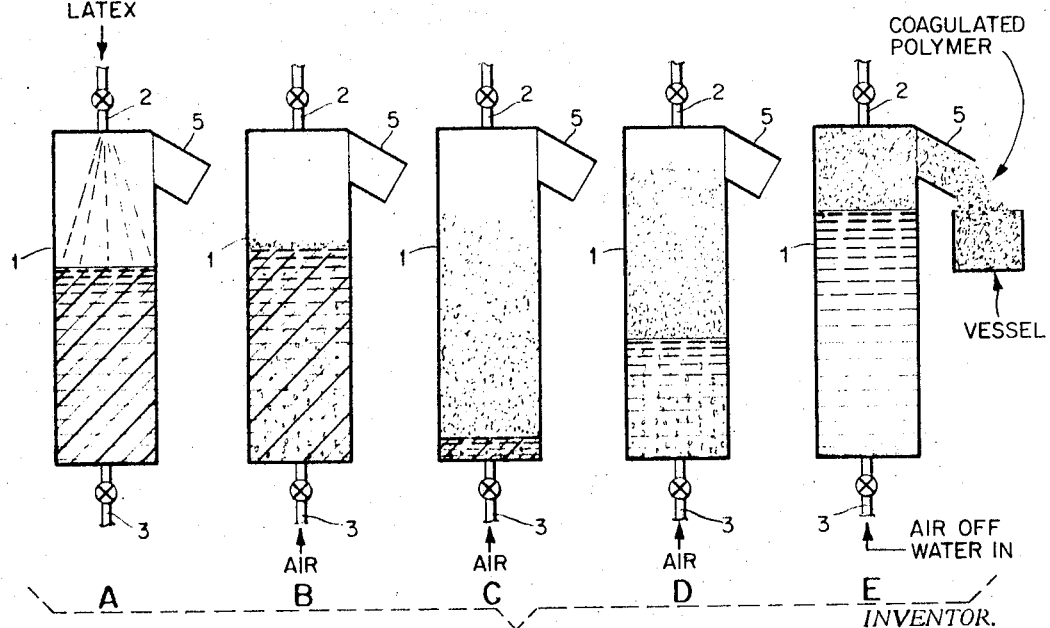
INVENTOR.
MATHEW B. BLACK, III
BY Emil W. Milan
ATTORNEY.

United States Patent Office 3,464,964
Patented Sept. 2, 1969

3,464,964
**COAGULATION OF POLYTETRAFLUORO-
ETHYLENE LATEX**
Matthew B. Black III, Ridley Park, Pa., assignor to Pennsalt Chemicals Corporation, Philadelphia, Pa., a corporation of Pennsylvania
Filed June 13, 1966, Ser. No. 557,207
Int. Cl. C08f 1/92
U.S. Cl. 260—92.1                                  4 Claims

ABSTRACT OF THE DISCLOSURE

Polytetrafluoroethylene latex is coagulated without the use of mechanically induced shear by passing inert gas in an upwardly flowing direction through the aqueous polymer latex to cause the polymer particles to coalesce and coagulate to permit their ready separation from the aqueous phase.

---

The invention relates to a process for coagulating polytetrafluoroethylene latex and aqueous dispersions of finely divided polytetrafluoroethylene particles. Particularly, it relates to a coagulation method employing a gaseous medium as the sole coagulating means. More particularly, it relates to a process employing air or other inert gas, as the sole coagulating means.

Coagulation of colloidal polytetrafluoroethylene (PTFE) from an aqueous dispersion has been the object of much laboratory and industrial concern. Various methods of coagulation have been investigated and some of them have been patented; see for example, U.S. Patents 2,593,583 and 3,046,263. In the processes used in the past, various mechanical means of agitation have been used; coagulants such as salts and solvents have been used; freezing has been proposed and used; and various combinations of these methods have been used.

Processes using mechanical agitation are objectionable in that some degree of undesirable shear force is put upon the soft polytetrafluoroethylene particles, resulting in deformed coagulated agglomerates which require high paste extrusion pressures, or which have a high frequency of extrusion defects, compared to the coagulated agglomerate powders of this invention. Introduction of salts or solvents into the latex is undesirable in that the salts or solvents must later be removed completely from the polymer, often with difficulty, to avoid contamination. The presence of salts is particularly objectionable in polytetrafluoroethylene particles intended for use in products for dielectric applications. Freezing as a means of coagulation is an expensive method, and requires high extrusion pressure for paste extrusion of the polytetrafluoroethylene.

The method of this invention avoids the above problems. Broadly, it includes the steps of (a) introducing aqueous polymer latex, substantially as produced in a polymerizer, into a coagulation tower having sufficient volume and height to hold the liquid mass during aeration and having sufficient free space for the coagulated, substantially hydrophobic, polymer solids to accumulate above the liquid level line; (b) diffusing bubbles of air or other inert gas through the latex up the coagulation tower, causing the latex particles to coalesce and gradually to coagulate into distinct physical particles which float to the top of the coagulation tower under the influence of a film of air or gas around each particle, so strongly held that the particle is no longer wetted by water; and then (c) removing the coagulated polymer solids from the water layer. If desired, the latex can be advantageously diluted with deionized water to permit greater dispersion of the air or gas in the water.

The non-wetting effect obtained during the aeration coagulation is such that polytetrafluoroethylene particles which normally have a specific gravity of about 2.2 become hydrophobic and float on water supported by the air film.

In a preferred method of operation, the latex is introduced at the bottom of a tower and the coagulant is discharged into a dephlegmator where the exhaust air is readily separated from the aqueous coagulant mass. The coagulated polymer is then directed to a filter where it is separated from the water.

The invention is illustrated in the accompanying drawing, in which FIGURE 1 is a fragmented schematic diagram of a cross-section of a coagulation tower designed to operate according to the method of the invention; and FIGURE 2 is a schematic diagram of a cross-section of a coagulation vessel showing different phases of the coagulation as they occur during aeration. In the drawing, the same numbers refer to the same parts.

In FIGURE 1, 1 represents a coagulation tower, 2 is an inlet line for aqueous polymer latex from a polymerizer discharge valve (not shown), 3 is an inlet line for filtered air from an air supply source, 4 is an inlet line for adding deionized water which is used for diluting the latex and flushing the tower, 5 is a discharge line from the coagulation tower through which the coagulated polytetrafluoroethylene flows along with exhaust air and the water in which the coagulant is suspended, 6 is a dephlegmator tower with an air vent 7 and a discharge line 8, the latter leading to a filter (not shown). At the bottom of coagulation tower 1 is a water drain line 9.

In practicing the invention according to a preferred embodiment, the aqueous polymer latex is introduced through line 2 into the coagulation tower 1, and sufficient deionized water is introduced through line 4 to dilute the latex to a desired dilution. Purified air at a constant volume and pressure is introduced continually at ambient temperature and pressure through line 3. The latex begins to coagulate under the agitation provided by the air, and as finite particles form, the particles coalesce into larger particles as the fine particles come into contact with each other and are occluded by a film of air which floats the particles to the top of the tower 1. The particles accumulate at the stop of tower 1 until they are sufficient in number to overflow through line 5 into the dephlegmator 6. The excess air vents through line 7. The coagulated polymer is recovered through line 8 and sent to a filter (not shown).

FIGURE 2 of the drawing shows the phase changes which occur during the coagulation of polytetrafluoroethylene latex according to the invention. In FIGURE 2, A represents a tower 1 into which aqueous polytetrafluoroethylene latex has been introduced through line 2. Tower B shows the latex at about the time aeration is begun by the introduction of air through line 3. Tower C shows the aerated latex about six minutes after aeration has begun, with a gel stage forming. Tower D shows coagulum rising upward in the tower, leaving substantially clear water at the bottom of the tower. Tower E shows the coagulum being floated out of the top of the tower through line 5 by addition of water through line 3, after the air has been turned off.

In contrast to methods employing mechanical agitation, the method of this invention imparts a minimum of shear and turbulence to the latex mass. Although the upward flow of air provides some agitation of the latex mass, it is to be observed that agitation is not the sole function of the air. Besides providing a moderate amount of turbulent agitation, the air bubbles, as they pass up the coagulation tower 1, have an unexpected effect which causes the colloidal particles of polytetrafluoroethylene in the latex to coalesce and to form distinct particles during the passage of the air and latex up the column. The rate of ascent of the air up the column essentially must be slow enough to permit the coagulum to form prior to or during the ascent. In the examples which follow, observe that a minimum period of time, generally measurable in minutes, is required before the coagulation phenomenon is completed.

The polytetrafluoroethylene latex which is coagulated by the method of this invention may be prepared by any of the methods commonly used for the polymerization preparation of such latices. Such latex usually contains from 5 to 50 weight percent of polytetrafluoroethylene based on the total composition. The coagulation process is preferably carried out at ambient temperatures and pressures.

The invention is further illustrated by the following examples in which the parts are by weight unless otherwise stated:

Example 1

A vertical cylinder measuring 4 inches in inner diameter and about 6 feet in height was equipped with an air inlet at the bottom of the cylinder. Polytetrafluoroethylene latex, prepared substantially by the method described in U.S. Patent No. 2,593,583, was poured into the cylinder to a height of about 2 feet. The latex, which originally contained 25% solids, was then diluted with deionized water to form a dilute latex containing 10% solids. Filtered air was introduced continuously into the bottom of the cylinder at a rate of 15 to 30 liters per minute at a head pressure of 1.5 p.s.i.g. At the end of ten minutes, substantially all the latex had coagulated and floated to the surface of the water layer, which was now clear, thus indicating that coagulation of the latex was complete. The coagulated polytetrafluoroethylene particles were skimmed off the water surface and then were dried at 120° C. for 10 hours. Particle size was found to be $\bar{d}_{50}=560\mu$. The resin was paste extruded at a pressure of 1700–2200 p.s.i.g., as a resin-naphtha mixture containing about 18% by weight of naphtha as an extrusion aid, at a reduction ratio of 144:1, with no defects. Reduction ratio is defined as $R=(D_b/D_a)^2$, where $D_b$=the diameter of the extrusion cylinder and $D_a$=the diameter of the orifice. See G. R. Snelling and J. F. Lontz, Journal of Applied Polymer Science, vol. III, 9, pages 257–265 (1960).

Example 2

The cylinder of Example 1 was filled to a three-foot level with similar latex which was dilute from 25% to 15% solid content. Air was introduced continuously at 15 to 30 liters per minute at a head pressure of 2 p.s.i.g. Coagulation took place in ten minutes. The coagulated resin was recovered, filtered and dried at 120° C. for ten hours. The particle size was found to be $\bar{d}_{50}=850\mu$. Resin-naphtha mixture, made from the resin wetted with about 18% by weight of naphtha, was extruded at a pressure between 1700 and 2270 p.s.i.g. at a reduction ratio of 144:1, with no defects.

Example 3

A significant difference has been found to exist in the extrusion pressure of air-coagulated and of motorized-agitator-coagulated particles of polytetrafluoroethylene resin from 10% solids content latices. The air-coagulated resin has been found to extruded at pressures of 1000 to 2500 p.s.i.g. lower than the comparable resin made by the motor-agitated method. The data are compared in Table 1. Each resin was paste extruded at a reduction ratio of 975:1.

TABLE 1

| Method | PTFE latex, ml. | Air flow, c.f.m. | Agitator, r.p.m. | Coagulation time, mins. | Percent solids in filtrate after coagulation | Extrusion pressure, p.s.i.g. |
| --- | --- | --- | --- | --- | --- | --- |
| Air | 4,000 | 20 | | 22 | 0.5 | 11,000 |
| Air | 4,000 | 20 | | 14 | <0.1 | 9,500 |
| Motorized-agitator | 2,000 | | 100 | 55 | 1.0 | >12,000 |
| Do | 2,000 | | 100 | 20 | 0.5 | >12,000 |

Example 4

As an unexpected advantage of the method of this invention, it was found that the particle size of the PTFE solids recovered from the process could be varied by diluting the latex to different dilutions. Results are shown in the following Table 2 of particle sizes obtained from coagulations carried out on polytetrafluoroethylene latices whose original solids contents were diluted with water to obtain the solids content shown. It is seen that particle size, as measured in microns, decreases with increase in dilution of the latex.

TABLE 2

| Solids content, original | Diluted | Particle size, microns $\bar{d}_{50}$ |
| --- | --- | --- |
| 25 | 25 | 950 |
| 18 | 18 | 890 |
| 15 | 15 | 770 |
| 25 | 13 | 550 |

Thus, by use of the method of this invention coagulated polytetrafluoroethylene particles of extreme fineness can be recovered. Furthermore, the particle size can be advantageously adjusted during the coagulation step to make the particles suitable for a particular use, such as paste extrusion to tubes or rods through dies, or film forming.

In practising the invention, the coagulation time can be varied to adjust the rate of air or inert gas coagulation to the size of tower being used and to the rate of production desired. Usually, a coagulation time of less than an hour will be adequate and, in many cases, as little as ten minutes of air or gas coagulation will be found adequate to coagulate substantially all the polytetrafluoroethylene in the latex.

While in the embodiments shown a coagulation tower preferably is used, it will be obvious to one skilled in the art that the latex also can be admixed with air bubbles and conducted through a series of pipes, or over a cascade of shallow vessels. The coagulation may be carried out continuously or batchwise. The coagulated polymer recovered from this process is useful for extrusion of polytetrafluoroethylene resin in the forms of film, fiber, tubing and pipe, all of which have important and well-known commercial utilities.

Although in the embodiments air has been used as the preferred form of inert gas, other inert gases, e.g., nitrogen, nitrogen-air mixtures, carbon dioxide, etc., can also be used advantageously.

Many different embodiments of this invention may be made without departing from the scope and spirit of it,

I claim:

1. A process for the coagulation of polytetrafluoroethylene latex to form paste extrudable particles thereof which comprises passing, in the absence of mechanical shear, an inert gas in an upwardly flowing direction through an aqueous mass consisting of a substantially colloidal dispersion of polytetrafluoroethylene containing about 5 to about 50 weight percent of polytetrafluoroethylene based on the weight of the dispersion at sufficient rate and in sufficient quantity for a time period sufficient to coagulate said latex to finite particles and separating said particles from the water of the aqueous phase.

2. The process according to claim 1 wherein the inert gas is air.

3. The process according to claim 1 wherein the coagulation is carried out at ambient temperatures and pressures.

4. The process according to claim 1 wherein the latex contains 13 to 25% weight percent of polytetrafluoroethylene.

References Cited
UNITED STATES PATENTS

| | | | |
|---|---|---|---|
| 1,376,459 | 5/1921 | Pedersen | 252—320 |
| 3,046,263 | 7/1962 | Whitlock | 260—92.1 |

JOSEPH L. SCHOFER, Primary Examiner

JOHN A. DONAHUE, JR., Assistant Examiner